(12) United States Patent
Yamamoto et al.

(10) Patent No.: US 11,256,970 B2
(45) Date of Patent: Feb. 22, 2022

(54) IMAGE PROCESSING METHOD, PRINTING METHOD, AND PRINTING SYSTEM

(71) Applicant: SEIKO EPSON CORPORATION, Tokyo (JP)

(72) Inventors: Gakuji Yamamoto, Nagano (JP); Masaaki Hagio, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/178,298

(22) Filed: Feb. 18, 2021

(65) Prior Publication Data

US 2021/0264229 A1 Aug. 26, 2021

(30) Foreign Application Priority Data

Feb. 20, 2020 (JP) .............................. JP2020-027007

(51) Int. Cl.
*G06K 15/02* (2006.01)
*G06K 15/10* (2006.01)

(52) U.S. Cl.
CPC ....... *G06K 15/1881* (2013.01); *G06K 15/102* (2013.01)

(58) Field of Classification Search
CPC .......................... G06K 15/1881; G06K 15/102
See application file for complete search history.

(56) References Cited

U.S. PATENT DOCUMENTS

| 2002/0070990 | A1 | 6/2002 | Yamasaki et al. | |
| 2009/0009779 | A1* | 1/2009 | Do | H04N 1/50 |
| | | | | 358/1.9 |
| 2009/0080003 | A1* | 3/2009 | Murakami | H04N 1/58 |
| | | | | 358/1.9 |

FOREIGN PATENT DOCUMENTS

| JP | 2002-292848 A | 10/2002 |
| JP | 2005-081565 A | 3/2005 |
| JP | 2006-168096 A | 6/2006 |

* cited by examiner

*Primary Examiner* — Quang N Vo
(74) *Attorney, Agent, or Firm* — Global IP Counselors, LLP

(57) ABSTRACT

An image processing method includes a correction density setting step, a pixel area discrimination step for extracting, based on image data, an edge pixel area including an edge pixel constituting a contour of a printing image, and discriminating an inner pixel area surrounded by the edge pixel area and the edge pixel area, a printing density setting step for setting a printing density of the inner pixel area as a correction density and a printing density of the edge pixel area as a printing density different from the correction density when the correction density is equal to or greater than a predetermined density threshold value, and setting the printing density of the inner pixel area and the printing density of the edge pixel area as the correction density when the correction density is less than the predetermined density threshold value, and a printing data generation step.

8 Claims, 10 Drawing Sheets

IMAGE PROCESSING METHOD, PRINTING METHOD, AND PRINTING SYSTEM

The present application is based on, and claims priority from JP Application Serial Number 2020-027007, filed Feb. 20, 2020, the disclosure of which is hereby incorporated by reference herein in its entirety.

BACKGROUND

1. Technical Field

The present disclosure relates to an image processing method, a printing method of performing printing using the image processing method, and a printing system.

2. Related Art

Hitherto, various techniques have been proposed in order to suppress degradation of printing quality due to bleed-through of ink when an ink jet printer performs printing of a character or a ruled line.

For example, JP-A-2006-168096 describes a technique of maintaining readability of a character by darkening density of a contour of the character even when density of ink is lightened in order to suppress bleed-through of the ink to a back surface during duplex printing.

Further, for example, JP-A-2002-292848 describes a technique capable of suppressing degradation of printing quality due to bleed-through of a contour of an image by lightening density of ink forming a contour line of the image being a printing target such as line drawing.

In the method described in JP-A-2006-168096, readability is maintained by darkening density of a contour of a character. However, depending on a degree to which density of a character is lightened, the character is outlined to have a darkened contour. Thus, there is a problem in that a desired printing image may not be obtained.

Further, in the method described in JP-A-2002-292848, depending on a degree to which density of a character or a ruled line is lightened, a gray scale value of a pixel forming a contour line is lowered. Thus, dots formed at a contour position are weeded out, and there is a problem in that printing of a sharp contour may not be performed.

SUMMARY

An image processing method according to the present disclosure is an image processing method of generating, based on image data, printing data for causing a printing apparatus to perform printing with a printing density of a printing image corrected, and the image processing method includes a correction density setting step for setting a correction density as a correction value for the printing density of the printing image, a pixel area discrimination step for extracting, based on the image data, an edge pixel area including an edge pixel constituting a contour of the printing image, and discriminating an inner pixel area surrounded by the edge pixel area and the edge pixel area, a printing density setting step for setting a printing density of the inner pixel area as the correction density and a printing density of the edge pixel area as a printing density different from the correction density when the correction density is equal to or greater than a predetermined density threshold value, and setting the printing density of the inner pixel area and the printing density of the edge pixel area as the correction density when the correction density is less than the predetermined density threshold value, and a printing data generation step for generating the printing data based on the printing density set in the printing density setting step.

Further, a printing method according to the present disclosure includes generating printing data using the image processing method, and performing printing based on the printing data.

Further, a printing system according to the present disclosure includes an image processing apparatus configured to generate printing data using the image processing method, and a printing apparatus configured to perform printing based on the printing data.

BRIEF DESCRIPTION OF THE DRAWINGS

FIG. 7 is a matrix illustrating calculation target pixels at the time of executing the edge extraction processing for each channel of RGB.

FIG. 8 is a matrix illustrating an example of gray scale values of calculation target pixels at the time of executing the edge extraction processing.

DESCRIPTION OF EXEMPLARY EMBODIMENTS

1. Exemplary Embodiment 1

Figure 1:
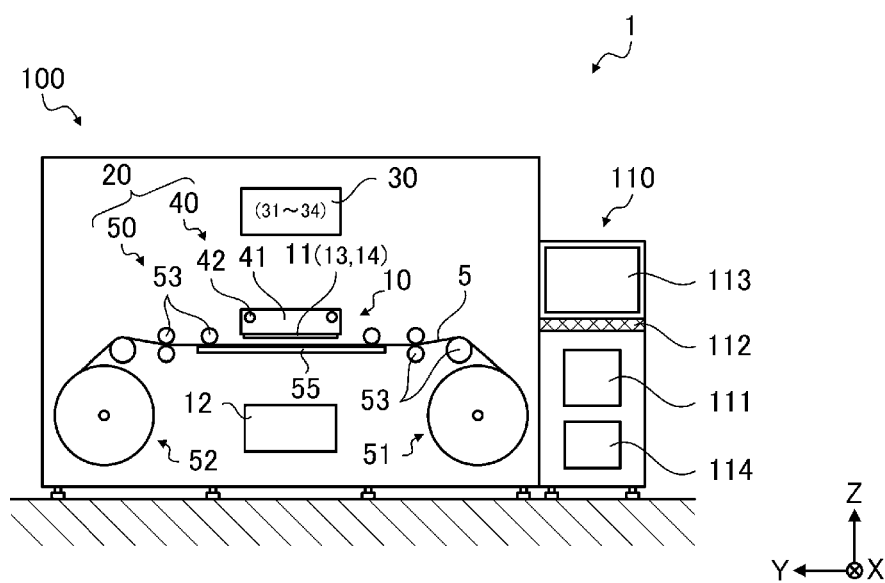
FIG. 1 is a front view illustrating a configuration of a printing system according to Exemplary Embodiment 1.
Figure 2:
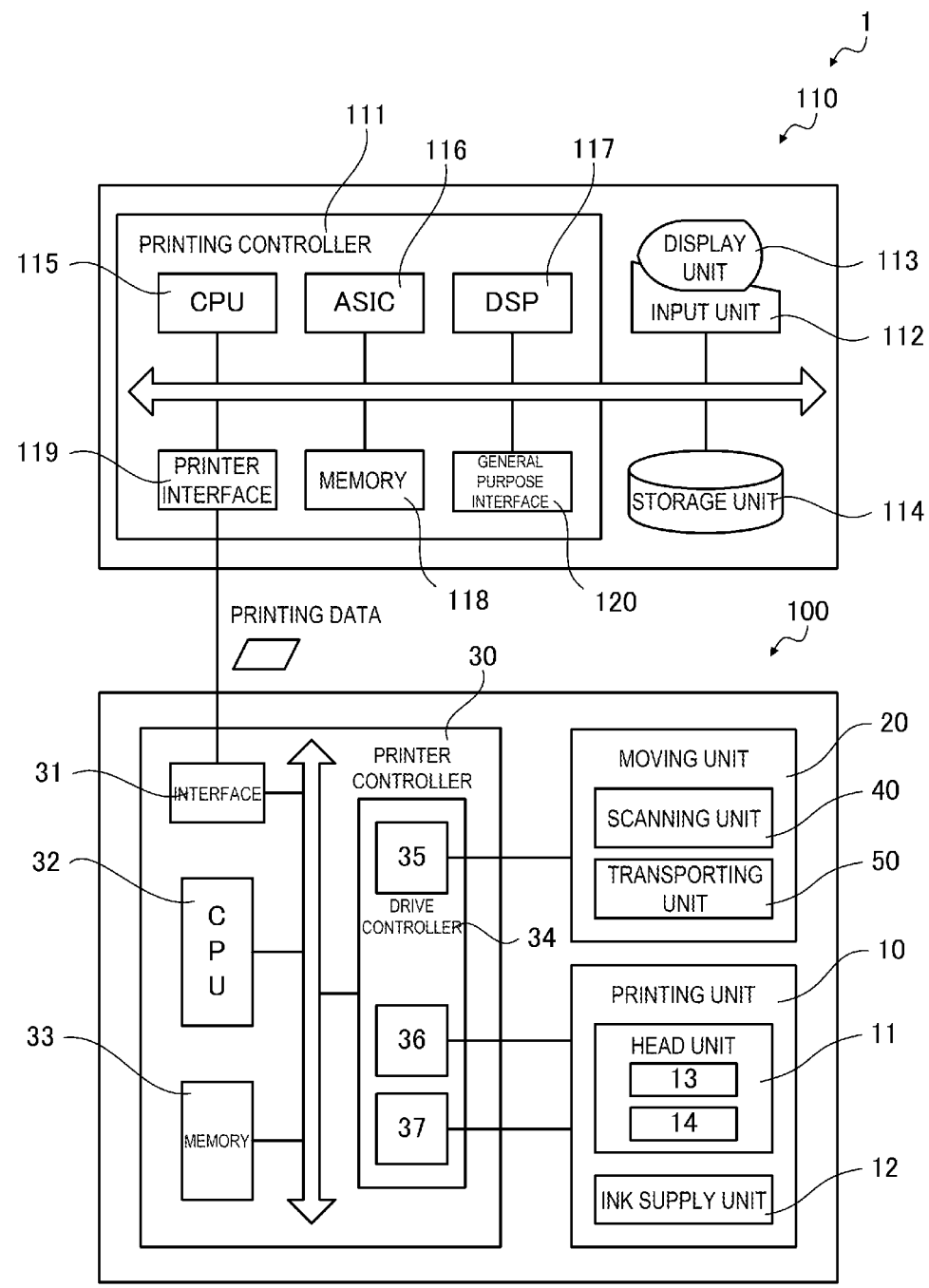
FIG. 2 is a block diagram illustrating the configuration of the printing system according to Exemplary Embodiment 1.

First, with reference to FIG. 1 and FIG. 2, a configuration of a printing system 1 according to the present exemplary embodiment is described.

Note that, as for coordinates given in the drawings, it is assumed that a Z-axis direction is an up/down direction, a +Z direction is an upward direction, an X-axis direction is a front/rear direction, a −X direction is a frontward direction, a Y-axis direction is a left/right direction, a +Y direction is a leftward direction, and an X-Y plane is a horizontal plane.

The printing system 1 includes a printer 100 as a printing apparatus and a personal computer 110 as an image processing apparatus connected to the printer 100. Hereinafter, the personal computer 110 is referred to as a PC 110.

The printer 100 is an ink jet printer that prints a desired image on a long-length printing medium 5 set in a roll shape, based on printing data received from the PC 110.

The PC 110 includes a printing controller 111, an input unit 112, a display unit 113, a storage unit 114, and the like, and controls print jobs for printing to be performed by the printer 100. Further, the PC 110 generates printing data for causing the printer 100 to print a desired image based on the image data.

Software operated by the PC 110 includes general image processing application software that deals with the image data to be printed, and printer driver software that generates printing data for controlling the printer 100 and causing the printer 100 to perform printing. In the following description, the image processing application software is simply referred to as an image processing application. Further, the printer driver software is simply referred to as a printer driver.

Here, the image data refers to text data or RGB digital image information including full-color image data and the like.

The printing controller 111 includes a CPU 115, an ASIC 116, a DSP 117, a memory 118, a printer interface 119, a general purpose interface 120, and the like, and performs centralized control for the entire printing system 1. CPU is an abbreviation for Central Processing Unit, ASIC is an abbreviation for Application Specific Integrated Circuit, and DSP is an abbreviation for Digital Signal Processor.

The input unit 112 is an information input means serving as a user interface. Specifically, the input unit 112 is, for example, a keyboard, a mouse pointer, and the like.

The display unit 113 is an information display means serving as a user interface, and displays information input from the input unit 112, images to be printed by the printer 100, information related to a print job, and the like, under the control of the printing controller 111.

The storage device 114 is a rewritable storage medium such as a hard disk drive or a memory card, and stores programs run by the printing controller 111, which serve as software run by the PC 110, an image to be printed, information related to a print job, and the like.

The memory 118 is a storage medium that secures a region for storing programs run by the CPU 115, a work region in which such programs are run, and the like, and includes storage elements such as a RAM and an EEPROM. RAM is an abbreviation for Random access memory, and EEPROM is an abbreviation for Electrically Erasable Programmable Read-Only Memory.

The general purpose interface 120 is, for example, an interface capable of connecting external electronic devices, such as a LAN interface and a USB interface. LAN is an abbreviation for Local Area Network, and USB is an abbreviation for Universal Serial Bus.

The printer 100 includes a printing unit 10, a moving unit 20, and a printer controller 30. The printer 100 that has received the printing data from the PC 110 causes the printer controller 30 to control the printing unit 10 and the moving unit 20, based on the printing data, and prints an image on the printing medium 5.

The printing data is image formation data obtained by converting the image data in such a way that the printer 100 can perform printing using the image processing application and the printer driver included in the PC 110, and includes a command for controlling the printer 100.

The printing unit 10 includes a head unit 11, an ink supply unit 12, and the like.

The moving unit 20 includes a scanning unit 40, a transporting unit 50, and the like.

The scanning unit 40 includes a carriage 41, a guide shaft 42, a carriage motor, and the like. The carriage motor is omitted in illustration.

The transporting unit 50 includes a supply portion 51, a housing portion 52, transporting rollers 53, a platen 55, and the like.

The head unit 11 includes a printing head 13 and a head controller 14. The printing head 13 includes a plurality of nozzle rows each having a plurality of nozzles for ejecting printing ink as ink droplets. The head unit 11 is mounted on the carriage 41, and reciprocates in the X-axis direction along with the carriage 41 that moves in the X-axis direction being a main scanning direction.

The ink supply unit 12 includes an ink tank, and an ink supply path through which ink is supplied from the ink tank to the printing head 13. The ink tank and the ink supply path are omitted in illustration.

As the ink, an ink set of four colors, which is obtained by adding black to an ink set of three colors including cyan, magenta, and yellow, is used.

The ink tank, the ink supply path, and an ink supply channel to nozzles that eject the same ink are provided separately for each ink.

As an ink jet method of ejecting ink droplets, a piezo method is employed. The piezo method is a printing method, in which a pressure corresponding to a printing information signal is applied to the ink stored in a pressure generating chamber by an actuator including a piezo element serving as a piezoelectric element, and ink droplets are jetted from a nozzle communicating with the pressure generating chamber.

Note that the method of ejecting ink droplets is not limited to this, and other printing methods may be used in which ink is ejected in a droplet form to form a group of dots on the printing medium 5.

The moving unit 20, that is, the scanning unit 40 and the transporting unit 50 cause the printing medium 5 to move relatively with respect to the printing head 13 under the control of the printer controller 30.

The guide shaft 42 extends in the X-axis direction, and supports the carriage 41 in a slidable contact state. Further, the carriage motor serves as a driving source when the carriage 41 reciprocates along the guide shaft 42. That is, the scanning unit 40 causes the carriage 41, that is, the printing head 13 to move in the X-axis direction along the guide shaft 42 under the control of the printer controller 30. The printing head 13 included in the head unit 11 mounted on the carriage 41 ejects ink droplets onto the printing medium 5 supported by the platen 55 under the control of the printer controller 30 while moving in the X-axis direction. With this, a plurality of dot rows along the X-axis direction are formed on the printing medium 5.

The supply portion 51 rotatably supports a reel on which the printing medium 5 is wounded into a roll, and feeds the printing medium 5 into a transport path. The housing portion 52 rotatably supports a reel for winding up the printing medium 5, and winds up, from the transport path, the printing medium 5 on which printing is completed.

The transporting rollers 53 include a driving roller, a driven roller, and the like. The driving roller causes the printing medium 5 to move in the Y-axis direction serving as a transport direction on the upper surface of the platen 55, and the driven roller rotates along with movement of the printing medium 5. The transporting rollers 53 constitute the transport path for transporting the printing medium 5 from the supply portion 51 to the housing portion 52 via a printing area of the printing unit 10. The printing area is an area in which the printing head 13 moves the X-axis direction on an upper surface of the platen 55.

The printer controller 30 includes an interface 31, a CPU 32, a memory 33, a drive controller 34, and the like, and controls the printer 100.

The interface 31 is connected to the printer interface 119 of the PC 110, and performs transmission and reception of data between the PC 110 and the printer 100.

The CPU 32 is an arithmetic processing unit for controlling the entire printer 100.

The memory 33 is a storage medium that secures a region for storing programs run by the CPU 32, a work region in which such programs are run, and the like, and includes storage elements such as a RAM and an EEPROM.

The CPU 32 controls the printing unit 10 and the moving unit 20 through the drive controller 34 in accordance with the programs stored in the memory 33 and the printing data received from the PC 110.

The drive controller 34 includes firmware operating under the control of the CPU 32, and controls driving of the head unit 11 and the ink supply unit 12 of the printing unit 10, and the scanning unit 40 and the transporting unit 50 of the moving unit 20. The drive controller 34 includes drive control circuits including a transfer control signal generating circuit 35, an eject control signal generating circuit 36, and a drive signal generating circuit 37, and a ROM and a flash memory incorporating firmware for controlling the drive control circuits. The ROM and the flash memory incorporating the firmware for controlling the drive control circuits are omitted in illustration. Here, ROM is an abbreviation for Read-Only Memory.

The transfer control signal generating circuit 35 is a circuit that generates a signal for controlling the scanning unit 40 and the transporting unit 50 of the moving unit 20, based on the printing data, in accordance with an instruction from the CPU 32.

The eject control signal generating circuit 36 is a circuit that generates a head control signal for selecting a nozzle for ejecting ink, selecting an ejection amount, controlling an ejection timing, and the like, based on the printing data, in accordance with an instruction from the CPU 32.

The drive signal generating circuit 37 is a circuit that generates a drive signal for driving the pressure generating chamber included in the printing head 13.

Figure 3:
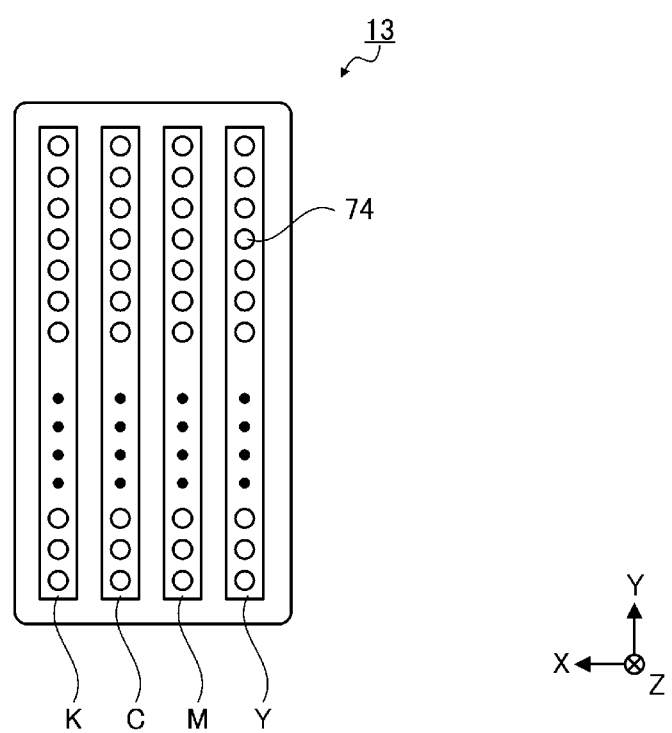
FIG. 3 is a schematic diagram illustrating an example of arrangement of nozzles when viewed from a lower surface of a printing head.

With reference to FIG. 3, an example of a configuration of the printing head 13 is described.

As illustrated in FIG. 3, the printing head 13 includes a black ink nozzle row K, a cyan ink nozzle row C, a magenta ink nozzle row M, and a yellow ink nozzle row Y, each of which is formed by aligning a plurality of nozzles 74 for ejecting ink. The plurality of nozzles 74 of each nozzle row are aligned and lined up at a constant interval along the transport direction, that is, along the Y-axis direction.

According to the configuration described above, the printer controller 30 prints a desired image on the printing medium 5 by repeating, with respect to the printing medium 5 supplied to the printing area by the supply portion 51 and the transporting roller 53, an operation of ejecting ink droplets from the printing head 13 while moving the carriage 41 that supports the printing head 13 along the guide shaft 42 in the X-axis direction, and an operation of moving, by the transporting roller 53, the printing medium 5 in the +Y-axis direction) intersecting with the X-axis direction.

Printing on the printing medium 5 is started by transmitting printing data to the printer 100 from the PC 110. The printing data is generated by the printer driver.

Figure 4:
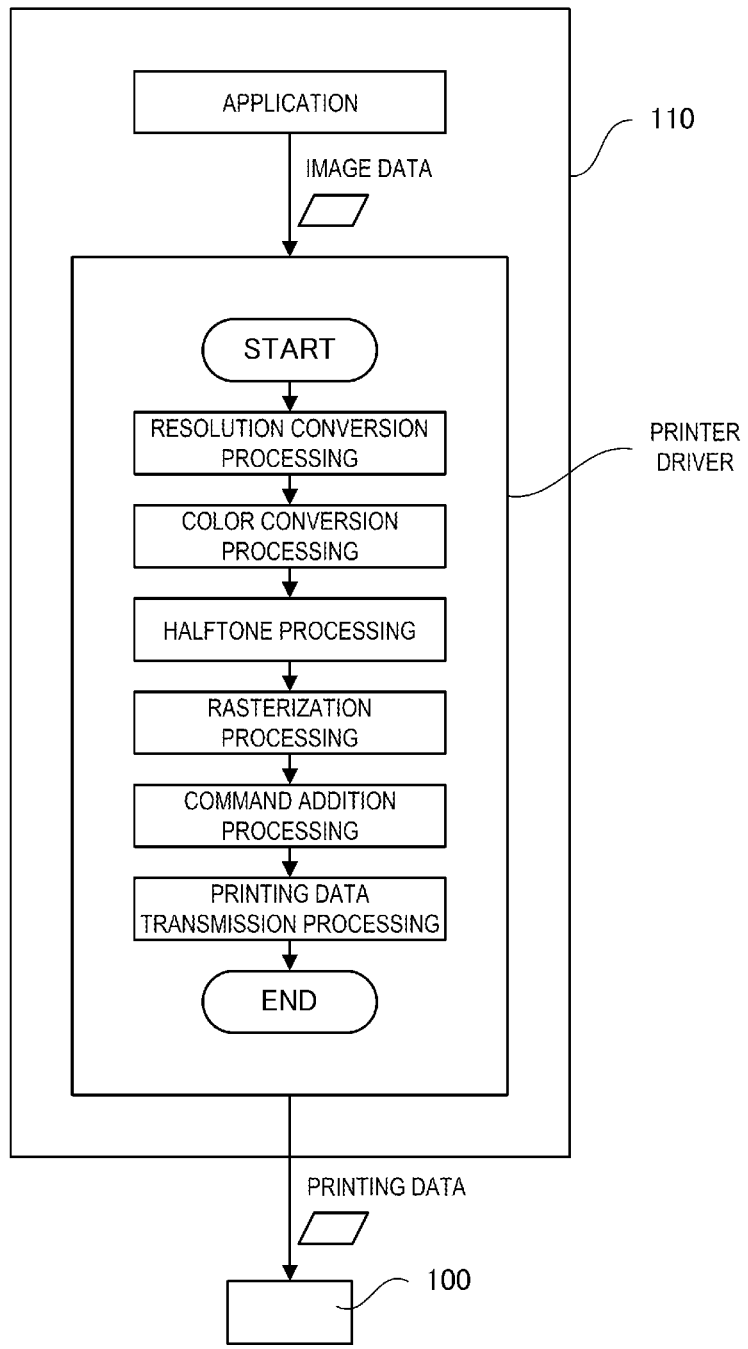
FIG. 4 is an explanatory view of basic functions of a printer driver.

With reference to FIG. 4, generation processing for printing data, which is executed by the printer driver, is described below.

The printer driver receives image data from the image processing application, converts the image data into printing data in a format that can be interpreted by the printer 100, and then outputs the printing data to the printer 100. For the conversion of the image data from the image processing application into the printing data, the printer driver executes resolution conversion processing, color conversion processing, halftone processing, rasterization processing, command addition processing, and the like.

The resolution conversion processing is processing of converting the image data output from the image processing application into a resolution for printing on the printing medium 5. For example, when a resolution for printing is specified as 720×720 dpi, vector format image data received from the image processing application is converted into bit map format image data having a 720×720 dpi resolution. Each pixel data of the image data after the resolution conversion processing includes pixels arranged in a matrix pattern. Each pixel has a gray scale value in, for example, 256 gray scales in the RGB color space. That is, each piece of the pixel data after the resolution conversion indicates the gray scale value of the corresponding pixel.

Among the pixels arranged in the matrix pattern, the pixel data corresponding to one row of pixels aligned in a predetermined direction is called raster data. Note that the predetermined direction in which the pixels corresponding to the raster data are aligned corresponds to the direction in which the printing head 13 moves during printing of an image, specifically, to the X-axis direction. Specifically, the direction in which the printing head 13 moves is a relative moving direction in which the printing head 13 and the printing medium 5 move relatively to each other.

The color conversion processing is processing of converting RGB data into data of a CMYK color system space. CMYK colors refer to cyan, magenta, yellow, and black. The image data of the CMYK color system space is data corresponding to the colors of the ink of the printer 100. Therefore, for example, when the printer 100 uses four types of ink of the CMYK color system, the printer driver generates image data in a four-dimensional space of the CMYK color system based on the RGB data.

This color conversion processing is performed based on a color conversion look-up table in which the gray scale values of the RGB data and the gray scale values of the CMYK color system data are associated with each other. Note that the pixel data after the color conversion processing is the CMYK color system data of, for example, 256 gray scales expressed in the CMYK color system space.

The halftone processing is processing of converting data of a large number of gray scales, for example, 256 gray scales into data of the number of gray scales that can be formed by the printer 100. Through this halftone processing, data expressing 256 gray scales is converted into, for example, 1-bit halftone data expressing two gray scales including dot and no dot and 2-bit halftone data expressing four gray scales including no dot, small dot, medium dot, and large dot. Specifically, based on a dot generation rate table in which gray scale values from 0 to 255 and dot generation rates are associated with each other, a generation rate of a dot corresponding to a gray scale value is obtained. For example, regarding a dot generation rate obtained correspondingly to a gray scale value in a case of four gray scales, a generation ratio for each of no dot, small dot, medium dot, and large dot is obtained. Specifically, at each of the obtained generation rates, pixel data is generated in such a way that dots are formed in a dispersed manner using a dither method, an error diffusion method, and the like.

The rasterization processing is processing of rearranging the 1-bit or 2-bit pixel data described above in the matrix pattern, according to a dot formation order for printing. The rasterization processing includes pass allocation processing of allocating the image data including the pixel data resulting from the halftone processing to each pass in which the printing head 13 ejects ink droplets while moving. Once the pass allocation is completed, actual nozzles that form respective raster lines constituting the printing image are allocated.

The command addition processing is processing of adding command data corresponding to a printing method, to the rasterized data. The command data is, for example, transporting data related to transporting specifications of the printing medium 5. The transporting specifications include, for example, a moving amount, a speed, and the like of the printing medium 5 in the transport direction on the upper surface of the platen 55.

The series of processing by the printer driver is performed by the ASIC 116 and the DSP 117 under the control of the CPU 115. Then, in printing data transmission processing, the printing data generated by the series of processing is transmitted to the printer 100 through the printer interface unit 119.

In addition to the basic functions of the printer driver as described above, the printer driver according to the present exemplary embodiment, that is, the printing system 1 further includes a function of suppressing degradation of printing quality due to bleed-through of ink.

In general printing, a dot formed by an ink droplet is absorbed in a printing medium, and thus a printing image is fixed onto the printing medium. However, when an ink droplet is ejected and applied onto the printing medium in density exceeding an absorption volume of the printing medium, or the printing medium has high permeability, part of an ink droplet exceeds a landing position, and spreads more than necessary in some cases. In view of this, for example, the printing system 1 has a function of reducing an ink amount to be applied onto the printing medium 5, that is, a function of setting density of a printing image to be light in a freely-selective manner in order to suppress bleed-through of ink to a back surface of the printing medium 5 and bleed-through of ink exceeding a contour of a printing image more than necessary. Further, the printing system 1 includes a function of edge processing for avoiding a situation where a desired printing image cannot be obtained or a sharp contour of a printing image such as a character, a ruled line, or the like cannot be obtained when density of the printing image is set to be light.

Details are described below.

As functions of the printer driver, the printing system 1 includes a correction density setting function of receiving setting of correction density as a correction value of printing density of a printing image, a pixel area discrimination function of discriminating an edge pixel area including edge pixels constituting a contour of the printing image and an inner pixel area surrounded by the edge pixel region, a printing density setting function of setting printing density of each of the inner pixel area and the edge pixel area, based on the value of the set correction density, and a printing data generation function of generating printing data, based on printing density set for each of the inner pixel area and the edge pixel area.

In other words, when being regarded as an image processing method including steps utilizing these functions, an image processing method according to the present exemplary embodiment includes a correction density setting step for receiving setting of correction density as a correction value of printing density of a printing image, a pixel area discrimination step for discriminating an edge pixel area including edge pixels constituting a contour of the printing image and an inner pixel area surrounded by the edge pixel region, a printing density setting step for setting printing density of each of the inner pixel area and the edge pixel area, based on the value of the set correction density, and a printing data generation step for generating printing data, based on printing density set for each of the inner pixel area and the edge pixel area.

In the correction density setting step, when printing is performed, correction specifications of printing density of a printing image, which are input from a user, is received as a correction value, and correction density is set. As the correction specifications received from a user, information relating to correction density as a numeral value, a density ratio with respect to printing density of a printing image before correction, specifications and a printing mode of the printing medium 5, which can be associated with correction density, and the like can be used. Further, the function of setting receiving the correction specifications and setting the correction density as a correction value can be achieved as a function of the printer driver by receiving an input from the input unit 112 via a user interface screen displayed by the display unit 113 and executing processing.

Figure 5:
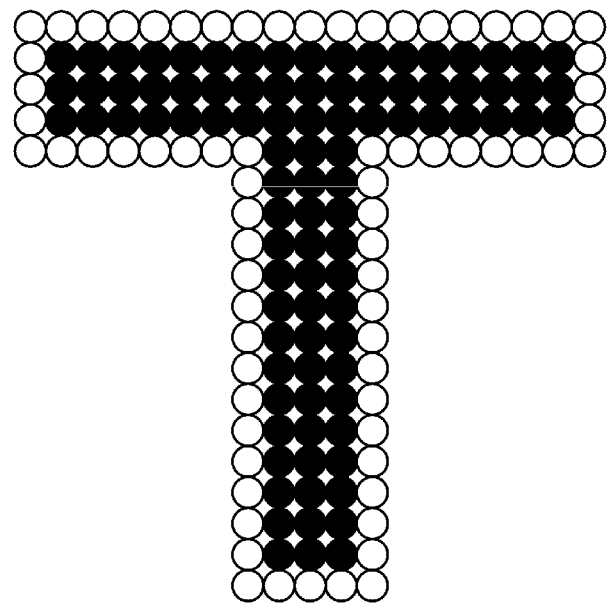
FIG. 5 is a schematic diagram illustrating an edge pixel area and an inner pixel area.

In the pixel area discrimination step, the edge pixel area including edge pixels constituting a contour of the printing image is extracted based on the image data of the printing target, and the inner pixel area surrounded by the edge pixel area and the edge pixel area are discriminated. For example, as illustrated in FIG. 5, in a character T as an example of a printing image, an edge pixel area indicated with while circles and an inner pixel area indicated with black circles can be discriminated. A method of extracting the edge pixel area is described later.

In the printing density setting step, when the set correction density is equal to or greater than a predetermined density threshold value, the printing density of the inner pixel area is set as the correction density. Further, as edge processing, the printing density of the edge pixel area is set as printing density different from the correction density.

Further, when the set correction density is less than the predetermined density threshold value, the printing density of the inner pixel area and the printing density of the edge pixel area are set as the correction density. Specifically, the set correction density is less than the predetermined density threshold value, the edge processing is not executed.

Here, the predetermined density threshold value is a value of the printing density set in advance, and is a threshold value for determining whether to execute the edge processing.

For example, in a case where the printing image is corrected to be light for the purpose of suppressing bleed-through of ink to the back surface of the printing medium 5, when the edge processing is executed in such a way that only density of the edge pixel area is not corrected in order to prevent a sharp contour of the printing image from being lost, the density of the edge pixel area is relatively darkened through the edge processing depending on a degree at which density of the printing image is lightened, and thus an image with an outlined contour is obtained in some cases. With regard to this point, when correction lighter than the predetermined density threshold value is performed, the edge processing is not executed. Thus, by setting the predetermined density threshold value as appropriate, formation of an image with an outlined contour is avoided, or suppressed.

Further, for example, when the edge processing of correcting the density of the edge pixel area to be lighter than the density of the edge pixel area in order to suppress degradation of printing quality due to bleed-through at the contour of the printing image, depending on a degree to which the density of the printing image is lightened, a gray scale value of a pixel forming a contour line is lowered through the edge processing. Thus, dots formed at a contour position are weeded out, and there is a problem in that printing of a sharp contour cannot be performed. With regard to this point, when correction lighter than the predetermined density threshold value is performed, the edge processing is not executed. Thus, by setting the predetermined density threshold value as appropriate, a situation where dots formed at a contour position are weeded out and printing of a sharp contour cannot be performed is avoided, or suppressed.

As described above, the predetermined density threshold value is a parameter affecting printing quality, and thus may be set in advance under sufficient evaluation. Note that a tolerance level with respect to formation of an image with an outlined contour and a tolerance level with respect to a situation where dots formed at a contour position are weeded out and printing of a sharp contour cannot be performed differ depending on a type and a purpose of the printing image, a user's taste, and the like. Thus, the predetermined density threshold value may be changed by user specification. For example, as a function of the printer driver, the user specification can be input from the input unit 112 via the user interface screen displayed by the display unit 113.

In the printing data generation step, the printing data is generated based on the printing density of the inner pixel area and the edge pixel area that are set in the printing density setting step. With the printing data generated based on the printing density of the inner pixel area and the edge pixel area that are set in the printing density setting step, printing is performed. With this, correction of the printing density is performed. Even in printing in which bleed-through of ink is suppressed, printing in which degradation of printing quality is suppressed can be performed.

Specific matters are further described in the following.

Figure 6:
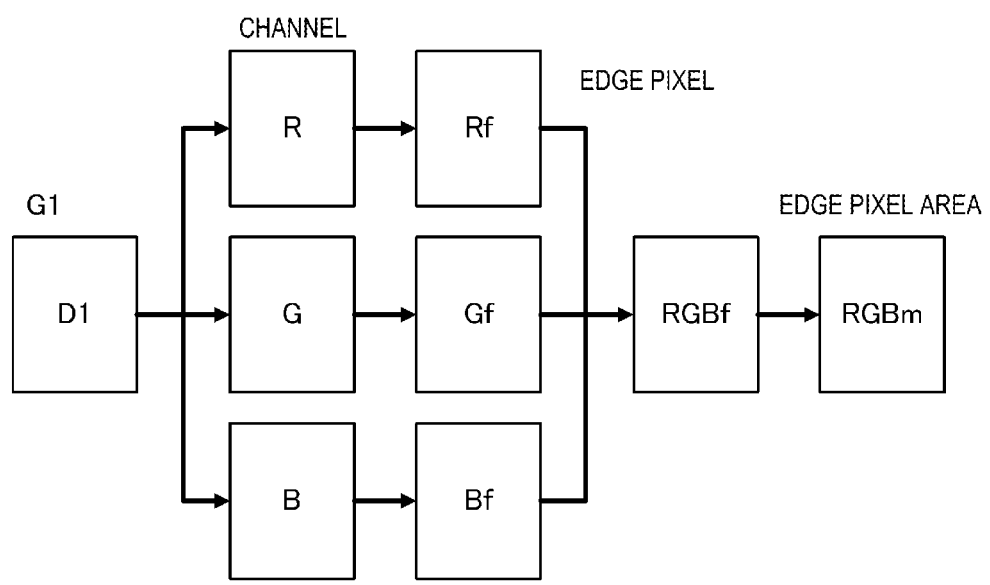
FIG. 6 is a conceptual diagram of edge extraction processing.

First, with reference to FIG. 6, edge extraction processing of extracting the edge pixel area is described.

For example, the edge extraction processing is a processing of extracting edge pixels constituting a contour of a printing image such as a character and a line drawing, based on image data, and extracting an edge pixel area subjected to the edge processing.

In the edge extraction processing, an edge pixel area including edge pixels constituting a contour of a printing image G1 is extracted based on image data D1 corresponding to a printing image G1.

As described in FIG. 6, in the edge extraction processing, first, RGB image data of the printing image G1 is separated into channels of red R, green G, and blue B, and an edge pixel Rf, an edge pixel Gf, and an edge pixel Bf are extracted for each channel. The algorithm for the edge pixel extraction is described later.

Subsequently, the pixels at positions determined to be edge pixels in each of the channels are merged, and the resultant is extracted as an edge pixel (RGBf) of the printing image G1.

Subsequently, in the edge pixel RGBf extracted in the edge extraction processing, an edge pixel area RGBm subjected to subsequent edge processing is determined. In the edge pixel area RGBm, which is a range subjected to the edge processing in the extracted edge pixel RGBf, a pixel range in the periphery of the edge pixel RGBf as a center is set in advance as the number of pixel pitches away from the edge pixel RGBf. When the number of pixel pitches away from the edge pixel RGBf is zero, the edge pixel RGBf is equivalent to the edge pixel area RGBm.

The pitch number designating the range of the edge pixel area RGBm may be determined as appropriate as a result of sufficient evaluation conducted in advance in accordance with a material used for the printing medium 5 and characteristics of ink. However, the pitch number may be changed by user specification. For example, as a function of the printer driver, the user specification can be input from the input unit 112 via the user interface screen displayed by the display unit 113.

The example illustrated in FIG. 5 is an example as a result of discriminating the edge pixel area indicated with the white circles and the inner pixel area indicated with the black circles when the pixel pitch away from the edge pixel RGBf is zero in the character T being an example of the printing image, that is, the edge pixels are equivalent to the edge pixel area.

Figures 7, 8:
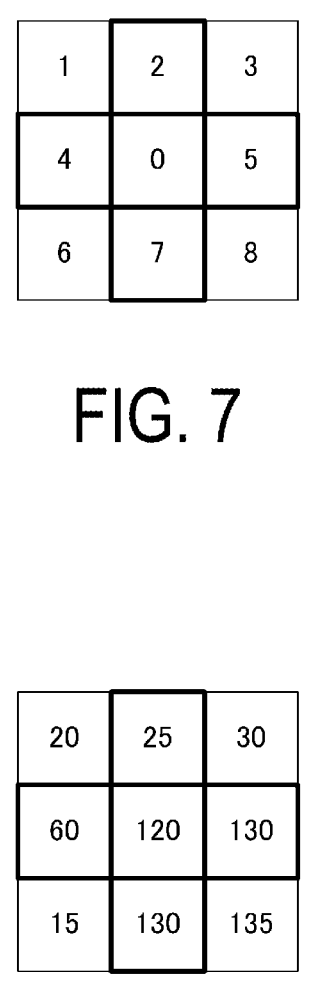

With reference to FIG. 7 and FIG. 8, the algorithm for edge pixel extraction is described.

The edge extraction processing is executed using a target pixel for determining whether the pixel is an edge pixel, that is, a focused pixel, and image data of four pixels in 3×3 pixels in the periphery, specifically, a gray scale value being a density value. Note that, in the following description, a larger gray scale value indicates greater density.

Among 3×3 pixels illustrated in FIG. 7, a pixel 0 is the focused pixel, pixels 2, 4, 5, and 7 are calculation target pixels for determination.

Determination on whether the target pixel is an edge pixel is based on a difference between a gray scale value of the focused pixel 0 and a gray scale value of each of the pixels 2, 4, 5, and 7 in the periphery. When a difference between the gray scale value of the focused pixel 0 and any one of the gray scale values of the pixels 2, 4, 5, and 7 exceeds a predetermined edge determination threshold value, and the gray scale value of the focused pixel 0 is larger than a gray scale value of a pixel in the periphery, which exceeds the predetermined edge determination threshold value, the focused pixel 0 is determined as an edge pixel. Further, when the focused pixel 0 is an end pixel that does not have all the calculation target pixels 2, 4, 5, and 7 in the periphery, similar determination is performed in a range of peripheral pixels that can be subjected to similar calculation.

For example, in the example illustrated in FIG. 8, when the predetermined edge determination threshold value is 90, a difference between the gray scale value of the focused pixel 0, which is 120, and the gray scale value of the peripheral pixel 2, which is 25, is 95, and thus the focused pixel 0 is determined as an edge pixel.

The predetermined edge determination threshold value for determining an edge pixel may be set as an appropriate value in advance, and may be changed by user specification. For example, as a function of the printer driver, the user specification can be input from the input unit 112 via the user interface screen displayed by the display unit 113.

Note that the edge extraction processing of discriminating the edge pixel area is not limited to the method described above as long as determination is based on a degree of a difference between gray scale values or distribution of gray scale values. For example, a method of performing calculation for eight target pixels in the periphery of the focused pixel 0 or a method of performing determination based on a degree of inclination of change in gray scale value in a wider range may be adopted. Further, instead of subjecting the RGB image data of the printing image G1 to the processing, image data in the CMYK color system after the color conversion processing may be similarly subjected to the processing.

In the present exemplary embodiment, as a specific example, in the edge processing of setting the printing density of the edge pixel area to be the printing density different from the correction density, a case where the printing density of the edge pixel area is set as printing density greater than the correction density is described. Specifically, in the printing density setting step, the printing density of the edge pixel area is set to as printing density greater than the printing density of the inner pixel area after correction.

Note that, in the following description, printing density of the printing image before correction is indicated with Db, correction density is indicated with Ds, a predetermined density threshold value is indicated with Dt, printing density of the edge pixel area, which is set in the printing density setting step, is indicated with De, and printing density of the inner pixel area, which is set in the printing density setting step, is indicated with Di.

Figure 9:
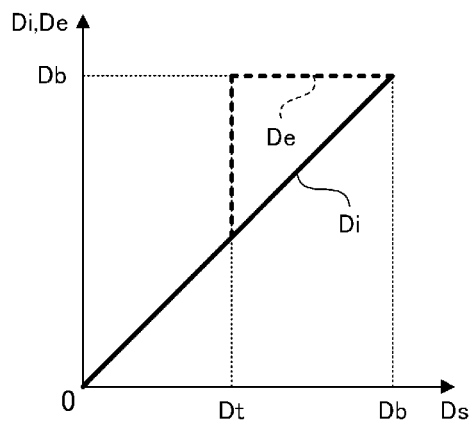
FIG. 9 is a graph for showing a relationship between correction density in Example 1, and a printing density of the edge pixel area and a printing density of the inner pixel area.
Figure 10:
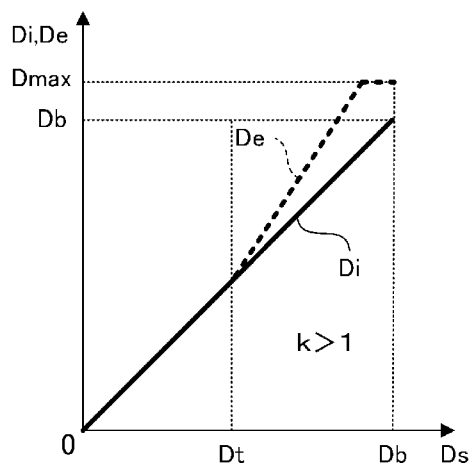
FIG. 10 is a graph for showing a relationship between correction density in Example 2, and printing density of the edge pixel area and printing density of the inner pixel area.
Figure 12:
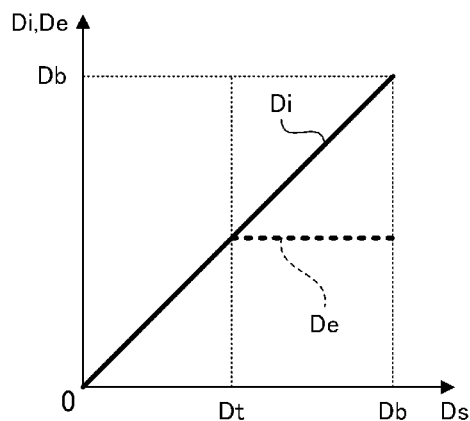
FIG. 12 is a graph for showing a relationship between correction density in Example 3, and printing density of the edge pixel area and printing density of the inner pixel area.
Figure 13:
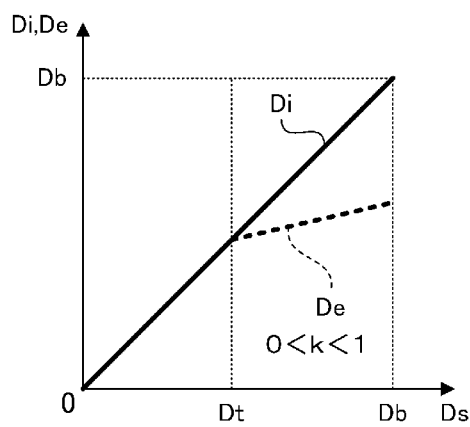
FIG. 13 is a graph for showing a relationship between correction density in Example 4, and printing density of the edge pixel area and printing density of the inner pixel area.
Figure 14:
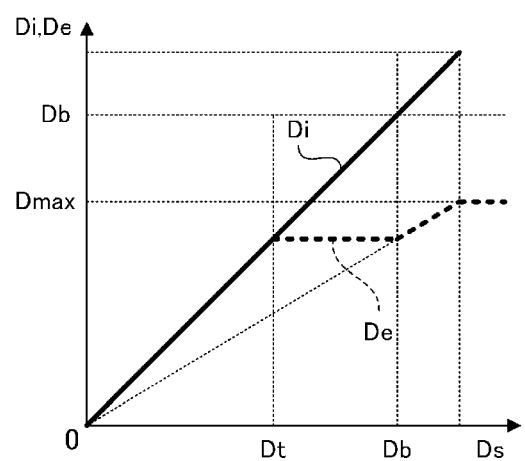
FIG. 14 is a graph for showing a relationship between correction density in Example 5, and printing density of the edge pixel area and printing density of the inner pixel area.

Further, in FIG. 9 and FIG. 10 illustrating examples in the present exemplary embodiment and FIG. 12 to FIG. 14 illustrating examples in Exemplary Embodiment 2 described later, the lateral axis indicates the correction density Ds, and the vertical axis indicates the printing density De of the edge pixel area and the printing density Di of the inner pixel area after setting the printing density. A relationship between the correction density Ds set as a correction value of the printing density, and the printing density Di of the inner pixel area and the printing density De of the edge pixel area, which are set based on the correction density Ds, is illustrated.

1.1 Example 1

With reference to FIG. 9, Example 1 is described.

In the present example, in the printing density setting step, when Ds<Dt is satisfied, Di=De=Ds is satisfied. Further, when Dt≤Ds<Db is satisfied, Di=Ds and De=Db are satisfied.

Specifically, when the correction density Ds for correcting the printing image to be lighter is set as density lower than the predetermined density threshold value Dt, both the printing density De of the edge pixel area and the printing density Di of the inner pixel area are set as the correction density Ds. That is, the edge processing is not executed.

Further, when the correction density Ds for correcting the printing image to be lighter is set as density equal to or greater than the predetermined density threshold value Dt, the printing density De of the edge pixel area is set to be remain as the printing density Db of the printing image before correction, the printing density Db being greater than the printing density of the inner pixel area Di, which is corrected to be the correction density Ds.

1.2 Example 2

With reference to FIG. 10, Example 2 is described. In the present example, in the printing density setting step, in a case where a maximum allowable printing density of the edge pixel area is indicated with Dmax, when Ds<Dt is satisfied, Di=De=Ds is satisfied. Further, when Dt Ds<Db is satisfied, Di=Ds and De=(Ds−Dt)k+Dt are satisfied while satisfying De≤Dmax. Further, when De that is calculated exceeds Dmax, De=Dmax is satisfied. Here, the coefficient k satisfies k>1.

Specifically, when the correction density Ds for correcting the printing image to be lighter is set as density lower than the predetermined density threshold value Dt, both the printing density De of the edge pixel area and the printing density Di of the inner pixel area are set as the correction density Ds. That is, the edge processing is not executed.

Further, when the correction density Ds for correcting the printing image to be lighter is set as density equal to or greater than the predetermined density threshold value Dt, the printing density De of the edge pixel area is set within a range equal to or less than the maximum allowable printing density Dmax, and is set as greater density as the correction density Ds is set higher than the printing density of the inner pixel area Di, which is corrected to be the correction density Ds.

Figure 11:
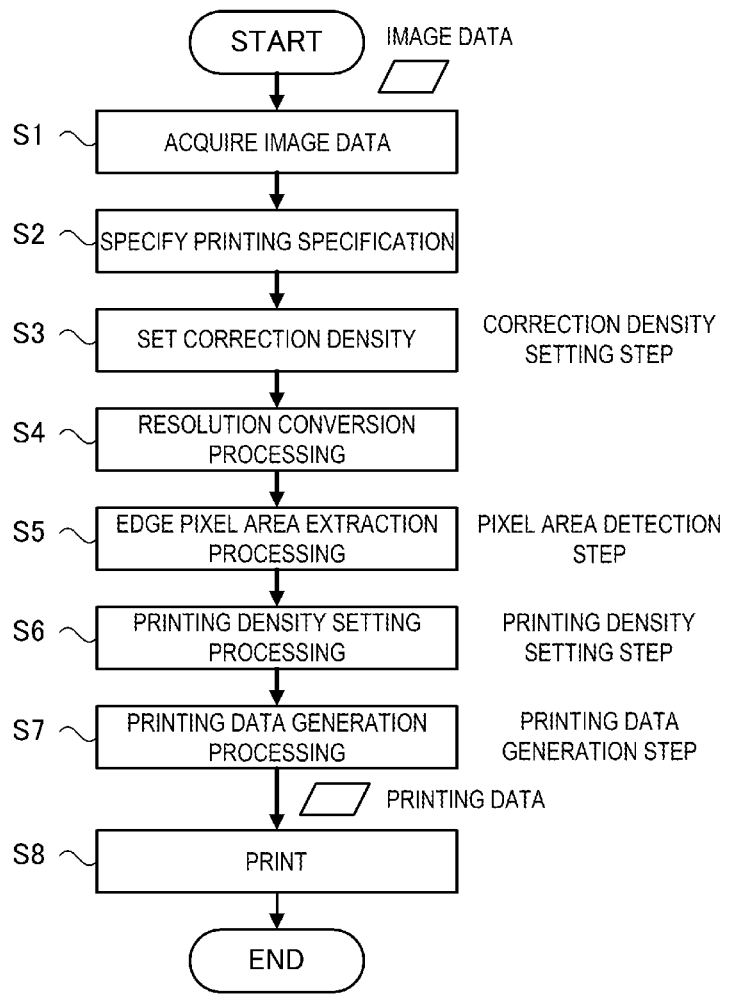
FIG. 11 is a flowchart of a printing method.

Subsequently, with reference to a flowchart illustrated in FIG. 11, a printing method including the image processing method described above is described.

First, as Step S1, the image data to be printed is acquired. Specifically, in the PC 110, as a function of the image processing application, the image data of the printing target is acquired from an external electronic device via the general purpose interface 120. Alternatively, the image data of the printing target is selected from the image data that is acquired and stored in the storage unit 114 in advance.

Subsequently, as Step S2, the printing specifications are determined. Specifically, as a function of the image processing application or the printer driver, an input is accepted from the input unit 112 via a user interface screen displayed by the display unit 113, and printing specifications including a size and a resolution of the printing image and a printing mode such as sharpness are determined.

Subsequently, as Step S3, the correction density is determined as a correction value of the printing density of the printing image. Specifically, as a function of the printer driver, an input of the correction specifications for the printing density of the printing image is accepted from the input unit 112 via a user interface screen displayed by the display unit 113, and the correction density as a correction value is set. Step S3 is the correction density setting step.

Subsequently, in Step S4, as a function of the printer driver, the image data is subjected to the resolution conversion processing. In Step S5, based on the image data after the resolution conversion processing, the edge pixel area including edge pixels constituting a contour of the printing image is extracted, and the inner pixel area surrounded by the edge pixel area and the edge pixel area are discriminated. Step S5 is the pixel area discrimination step.

Subsequently, in Step S6, as a function of the printer driver, based on the value of the set correction density and the predetermined density threshold value, the inner pixel area and the printing density of the edge pixel area are set. Step S6 is the printing density setting step.

Subsequently, in Step S7, as a function of the printer driver, based on the printing density of the inner pixel area and the printing density of the edge pixel area that are respectively set, the printing data is generated. Specifically, in the printing data generation processing executed by the printer driver, which is illustrated in FIG. 4, processing from color conversion processing to command addition processing is executed. Step S7 is the printing data generation step for generating the printing data.

Subsequently, in Step S8, as a function of the printer driver, the generated printing data is transmitted to the printer 100, and the printer 100 performs printing, based on the received printing data. Step S8 is a step for performing printing based on the printing data.

According to the present embodiment, the following effects can be exerted.

First, in the image processing method according to the present exemplary embodiment, in a case where the printing density of the printing image is corrected, when the correction density is equal to the predetermined density threshold value or greater than the predetermined density threshold value, the printing density of the inner pixel area is set as the correction density, and the printing density of the edge pixel area is set as the printing density different from the correction density. Further, in a case where the printing density of the printing image is corrected, when the correction density is lighter than the predetermined density threshold value, the printing density of the inner pixel area and the printing density of the edge pixel area are set as the correction density.

Specifically, for example, in a case where degradation of printing quality is suppressed by executing the edge processing in which, as the printing image, the printing density of the inner pixel area is corrected but the printing density of the edge pixel area is not corrected, or the printing density of the edge pixel area is set as the printing density greater than the correction density of the inner pixel area, when the correction density is lighter than the predetermined density threshold value, the edge processing is not executed. As a result, the predetermined density threshold value is set as appropriate in advance, and thus the correction density is set to be lighter. With this, the density of the edge pixel area is relatively dark through the edge processing, and formation of an image with an outlined contour is avoided, or suppressed.

Further, in the printing density setting step in Example 1 and Example 2 in the present exemplary embodiment, when the correction density is equal to the predetermined density threshold value or is greater than the predetermined density threshold value, the printing density of the edge pixel area is set as printing density greater than the correction density. Further, when the correction density is lighter than the predetermined density threshold value, the printing density of the inner pixel area and the printing density of the edge pixel area are set as the correction density.

Specifically, in a case where degradation of printing quality of the printing image is suppressed by executing the edge processing of setting the printing density of the edge pixel area as the printing density greater than the correction density of the inner pixel area, when the correction density is lighter than the predetermined density threshold value, the edge processing is not executed. As a result, the predetermined density threshold value is set as appropriate in advance, and thus the correction density is set to be lighter. With this, the density of the edge pixel area is relatively dark through the edge processing, and formation of an image with an outlined contour is avoided, or suppressed.

Further, in Example 1 in the present exemplary embodiment, when $Dt \leq Ds < Db$ is satisfied, $Di = Ds$ and $De = Db$ are satisfied. Thus, when the inner pixel area is lightened to have the correction density Ds, the edge processing of setting the density of the edge pixel area to be greater than the density of the edge pixel area can be executed.

Further, when $Ds < Dt$ is satisfied, $Di = De = Ds$ is satisfied, specifically, the edge processing is not executed. Thus, a situation where the density of the edge pixel area is relatively dark through the edge processing and an image with an outlined contour is obtained is avoided.

Further, in Example 2 in the present exemplary embodiment, when $Dt \leq Ds < Db$ is satisfied while satisfying $k>1$ and $De \leq Dmax$, $Di = Ds$ and $De = (Ds-Dt)k+Dt$ are satisfied. Thus, when the inner pixel area is lightened to have the correction density Ds, the edge processing of setting the density of the edge pixel area to be greater than the density of the edge pixel area can be executed. Further, in this case, as Ds is set as lighter density, De is lighter. Specifically, as Ds is closer to the predetermined density threshold value, a difference between the density of the edge pixel area and the density of the edge pixel area is smaller. Thus, a situation where an image with an outlined contour through the edge processing is suppressed.

Further, when $k>1$ and $Ds<Dt$ are satisfied, $Di = De = Ds$ is satisfied. Specifically, the edge processing is not executed. Thus, when the predetermined density threshold value is set as appropriate in advance, a situation where the density of the edge pixel area is relatively dark through the edge processing and an image with an outlined contour is obtained is avoided.

Further, in the printing method according to the present exemplary embodiment, when the predetermined density threshold value is set as appropriate in advance, printing in which degradation of printing quality due to the correction density set to be light is suppressed can be performed.

Further, with the printing system 1 according to the present exemplary embodiment, when the predetermined density threshold value is set as appropriate in advance, printing in which degradation of printing quality due to the correction density set to be light is suppressed can be performed.

2. Exemplary Embodiment 2

In Exemplary Embodiment 1, as Example 1 and Example 2, a case where the printing density of the edge pixel area is set as the printing density greater than the correction density in the printing density setting step when the correction density is equal to or greater than the predetermined density threshold value is described. In the present exemplary embodiment, a case where the printing density of the edge pixel area is set as the printing density lower than the correction density in the printing density setting step when the correction density is more than the predetermined density threshold value is described. Specifically, in the printing density setting step, the printing density of the edge pixel area is set to as printing density lower than the printing density of the inner pixel area after correction.

2.1 Example 3

With reference to FIG. 12, Example 3 is described. In the present example, in the printing density setting step, when $Ds<Dt$ is satisfied, $Di = De = Ds$ is satisfied. Further, when $Dt \leq Ds < Db$ is satisfied, $Di = Ds$ and $De = Dt$ are satisfied.

Specifically, when the correction density Ds for correcting the printing image to be lighter is set as density lower than the predetermined density threshold value Dt, both the printing density De of the edge pixel area and the printing density Di of the inner pixel area are set as the correction density Ds. That is, the edge processing is not executed.

Further, when the correction density Ds for correcting the printing image to be lighter is set as density equal to or greater than the predetermined density threshold value Dt, the printing density De of the edge pixel area is set as the predetermined density threshold value Dt lighter than the printing density of the inner pixel area Di, which is corrected to be the correction density Ds.

2.2 Example 4

With reference to FIG. 13, Example 4 is described. In the present example, in the printing density setting step, when Ds<Dt is satisfied, Di=De=Ds is satisfied. Further, when Dt≤Ds<Db is satisfied, Di=Ds and De=(Ds−Dt)k+Dt are satisfied. Here, the coefficient k satisfies 0<k<1.

Specifically, when the correction density Ds for correcting the printing image to be lighter is set as density lower than the predetermined density threshold value Dt, both the printing density De of the edge pixel area and the printing density Di of the inner pixel area are set as the correction density Ds. That is, the edge processing is not executed.

Further, when the correction density Ds for correcting the printing image to be lighter is set as density equal to or greater than the predetermined density threshold value Dt, the printing density De of the edge pixel area is set within a density range lighter than the printing density of the inner pixel area Di, which is corrected to be the correction density Ds, and is set as greater density as the correction density Ds is set higher.

2.3 Example 5

With reference to FIG. 14, Example 5 is described. The present example includes a case where setting of the correction density Ds is set as greater density than the printing density Db of the printing image before correction with respect to Example 3.

In the present example, in the printing density setting step, when Ds<Dt is satisfied, Di=De=Ds is satisfied. When Dt≤Ds<Db is satisfied, Di=Ds and De=Dt are satisfied. When Db S Ds is satisfied, De=DsDt/Db is satisfied. Further, when De that is calculated exceeds Dmax, De=Dmax is satisfied.

Specifically, when the correction density Ds for correcting the printing image to be lighter is set as density lower than the predetermined density threshold value Dt, both the printing density De of the edge pixel area and the printing density Di of the inner pixel area are set as the correction density Ds. That is, the edge processing is not executed.

Further, when the correction density Ds for correcting the printing image to be lighter is set within a range lighter than the printing density Db of the printing image before correction, and is set as density equal to or greater than the predetermined density threshold value Dt, the printing density De of the edge pixel area is set as the predetermined density threshold value Dt lighter than the printing density of the inner pixel area Di, which is corrected to be the correction density Ds.

Further, when setting of the correction density Ds is set as density equal to or greater than the printing density Db of the printing image before correction, the printing density De of the edge pixel area is set within a range equal to or less than the maximum allowable printing density Dmax, and is set as greater density as the correction density Ds is higher within a density range lighter than the printing density of the inner pixel area Di, which is corrected to be the correction density Ds.

According to the present embodiment, the following effects can be exerted.

In a case where the printing density of the printing image is corrected, when the correction density is equal to the predetermined density threshold value or, is greater than the predetermined density threshold value, the printing density of the inner pixel area is set as the correction density, and the printing density of the edge pixel area is set as the printing density different from the correction density. Further, in a case where the printing density of the printing image is corrected, when the correction density is lighter than the predetermined density threshold value, the printing density of the inner pixel area and the printing density of the edge pixel area are set as the correction density.

Specifically, for example, in a case where degradation of printing quality is suppressed by executing the edge processing of setting the printing density of the edge pixel area as the printing density lower than the correction density of the inner pixel area, when the correction density is lighter than the predetermined density threshold value, the edge processing is not executed. As a result, when the predetermined density threshold value is set as appropriate in advance, the correction density is set to be light, and a gray scale value of a pixel forming a contour line is lowered through the edge processing. With this, a situation where dots formed at a contour position are weeded out and printing of a sharp contour cannot be performed is avoided, or suppressed.

Further, in the printing density setting step in Example 3 and Example 4 in the present exemplary embodiment, when the correction density is equal to the predetermined density threshold value, or is greater than the predetermined density threshold value, the printing density of the edge pixel area is set as the printing density lower than the correction density. Further, when the correction density is lighter than the predetermined density threshold value, the printing density of the inner pixel area and the printing density of the edge pixel area are set as the correction density.

Specifically, in a case where degradation of printing quality of the printing image is suppressed by executing the edge processing of setting the printing density of the edge pixel area as the printing density lower than the correction density of the inner pixel area, when the correction density is lighter than the predetermined density threshold value, the edge processing is not executed. As a result, when the predetermined density threshold value is set as appropriate in advance, the correction density is set to be light, and a gray scale value of a pixel forming a contour line is lowered through the edge processing. With this, a situation where dots formed at a contour position are weeded out and printing of a sharp contour cannot be performed is avoided, or suppressed.

Further, in Example 3 in the present exemplary embodiment, when Dt≤Ds<Db is satisfied, Di=Ds and De=Dt are satisfied. Thus, when the inner pixel area is lightened to have the correction density Ds, the edge processing of setting the density of the edge pixel area to be lighter than the density of the edge pixel area can be executed.

Further, when Ds<Dt is satisfied, Di=De=Ds is satisfied, specifically, the edge processing is not executed. Thus, when the predetermined density threshold value is set as appropriate in advance, a gray scale value of a pixel forming a contour line is lowered through the edge processing, and a situation where dots formed at a contour position are weeded out and printing of a sharp contour cannot be performed is avoided.

Further, in Example 4 in the present exemplary embodiment, when k<1 and Dt≤Ds<Db are satisfied, Di=Ds and De=(Ds−Dt)k+Dt are satisfied. Thus, when the inner pixel area is lightened to have the correction density Ds, the edge processing of setting the density of the edge pixel area to be lighter than the density of the edge pixel area can be executed.

Further, when k<1 and Ds<Dt are satisfied, Di=De=Ds is satisfied, specifically, the edge processing is not executed. When the predetermined density threshold value is set as appropriate in advance, a gray scale value of a pixel forming a contour line is lowered through the edge processing, and a situation where dots formed at a contour position are weeded out and printing of a sharp contour cannot be performed is avoided.

Further, in Example 5 in the present exemplary embodiment, similar effects can also be exerted in a case where setting of the correction density Ds is set as greater density than the printing density Db of the printing image before correction with respect to Example 3.

Note that it is described that the printing system 1 includes the printer 100 as a printing apparatus and the personal computer 110 as an image processing apparatus connected to the printer 100. However, the printer 100 may have a function of the personal computer 110, and the printing system 1 may be configured as one printing apparatus.

Further, the edge extraction processing described above may not be necessarily a method of performing determination based on a gray scale value in image data in the RGB or CMYK color system. Specifically, for example, a method of performing determination based on distribution of 1-bit or 2-bit halftone data after halftone processing may be adopted.

In this case, the 1-bit or 2-bit halftone data as an extracted edge pixel data is subjected to the edge processing. Specifically, for example, in a case where the edge processing is processing of lightening the printing density of the edge pixel area, when the halftone data is constituted of data of 2-bit or more indicating four gray scales, specifically, a plurality of dot sizes of no dot, small dot, medium dot, and large dot, each piece of the halftone data is converted into a dot downsized by one rank. Note that, in a case of small dot, downsizing by one rank is equivalent to change to no dot. Further, for example, in a case where the edge processing is processing of darkening the printing density of the edge pixel area, when the halftone data is constituted of data of 2-bit or more indicating four gray scales, specifically, a plurality of dot sizes of no dot, small dot, medium dot, and large dot, the halftone data for small dot and medium dot is converted into a dot upsized by one rank.

What is claimed is:

1. An image processing method of generating, based on image data, printing data for causing a printing apparatus to perform printing with a printing density of a printing image corrected, the image processing method comprising:
    a correction density setting step for setting a correction density as a correction value for the printing density of the printing image;
    a pixel area discrimination step for extracting, based on the image data, an edge pixel area including an edge pixel constituting a contour of the printing image, and discriminating an inner pixel area surrounded by the edge pixel area and the edge pixel area;
    a printing density setting step for setting a printing density of the inner pixel area as the correction density and a printing density of the edge pixel area as a printing density different from the correction density when the correction density is equal to or greater than a predetermined density threshold value, and setting the printing density of the inner pixel area and the printing density of the edge pixel area as the correction density when the correction density is less than the predetermined density threshold value; and
    a printing data generation step for generating the printing data based on the printing density set in the printing density setting step.

2. The image processing method according to claim 1, wherein
    in the printing density setting step, when the correction density is equal to or greater than the predetermined density threshold value, the printing density of the edge pixel area is set as a printing density greater than the correction density.

3. The image processing method according to claim 1, wherein
    in the printing density setting step, when the correction density is equal to or greater than the predetermined density threshold value, the printing density of the edge pixel area is set as a printing density lower than the correction density.

4. The image processing method according to claim 1, wherein
    when Dt≤Ds<Db, Di=Ds and De=Db, and when Ds<Dt, Di=De=Ds,
    where the printing density of the printing image before correction is Db;
    the correction density is Ds;
    the predetermined density threshold value is Dt;
    the printing density of the edge pixel area, which is set in the printing density setting step, is De; and
    the printing density of the inner pixel area, which is set in the printing density setting step, is Di.

5. The image processing method according to claim 1, wherein
    provided that De≤Dmax,
    when Dt≤Ds<Db, Di=Ds and De=(Ds−Dt)k+Dt, and when Ds<Dt, Di=De=Ds,
    where the printing density of the printing image before correction is Db;
    the correction density is Ds;
    the predetermined density threshold value is Dt;
    the printing density of the edge pixel area, which is set in the printing density setting step, is De;
    a maximum allowable printing density of the edge pixel area is Dmax;
    the printing density of the inner pixel area, which is set in the printing density setting step, is Di; and
    a coefficient is k.

6. The image processing method according to claim 1, wherein
    when Dt≤Ds<Db, Di=Ds and De=Dt, and when Ds<Dt, Di=De=Ds,
    where the printing density of the printing image before correction is Db;
    the correction density is Ds;
    the predetermined density threshold value is Dt;
    the printing density of the edge pixel area, which is set in the printing density setting step, is De; and
    the printing density of the inner pixel area, which is set in the printing density setting step, is Di.

7. A printing method, comprising:
generating printing data using the image processing method according to claim 1; and
performing printing based on the printing data.

8. A printing system, comprising:
an image processing apparatus configured to generate printing data using the image processing method according to claim 1; and
a printing apparatus configured to perform printing based on the printing data.

* * * * *